US011380460B2

(12) United States Patent
Tasiopoulos et al.

(10) Patent No.: US 11,380,460 B2
(45) Date of Patent: Jul. 5, 2022

(54) ELECTRIC VEHICLE ONBOARD CHARGING CABLE COOLING

(71) Applicant: Hanon Systems, Daejeon (KR)

(72) Inventors: James Tasiopoulos, West Bloomfield, MI (US); Dale Rife, South Lyon, MI (US); Dale Filhart, South Lyon, MI (US)

(73) Assignee: HANON SYSTEMS, Daejeon (KR)

( * ) Notice: Subject to any disclaimer, the term of this patent is extended or adjusted under 35 U.S.C. 154(b) by 741 days.

(21) Appl. No.: 16/394,070

(22) Filed: Apr. 25, 2019

(65) Prior Publication Data

US 2020/0343022 A1     Oct. 29, 2020

(51) Int. Cl.
*H01B 7/42* (2006.01)
*B60L 53/18* (2019.01)
*B60K 6/22* (2007.10)

(52) U.S. Cl.
CPC .............. *H01B 7/423* (2013.01); *B60L 53/18* (2019.02); *B60K 6/22* (2013.01); *B60Y 2200/91* (2013.01); *B60Y 2200/92* (2013.01); *B60Y 2300/91* (2013.01); *B60Y 2306/05* (2013.01)

(58) Field of Classification Search
CPC ................................. H01B 7/423; B60L 53/18
See application file for complete search history.

(56) References Cited

U.S. PATENT DOCUMENTS

| 3,952,141 | A | * | 4/1976 | Hubner | H01B 9/001 |
| | | | | | 174/15.7 |
| 3,955,042 | A | | 5/1976 | Kellow et al. | |
| 9,321,362 | B2 | * | 4/2016 | Woo | H02J 7/0029 |
| 9,701,210 | B2 | | 7/2017 | Woo et al. | |
| 9,935,434 | B2 | | 4/2018 | Soerensen | |
| 2013/0267115 | A1 | * | 10/2013 | Mark | B60L 53/18 |
| | | | | | 439/485 |
| 2015/0217654 | A1 | * | 8/2015 | Woo | B60L 53/18 |
| | | | | | 320/109 |
| 2017/0338006 | A1 | * | 11/2017 | Gontarz | B60L 3/00 |

FOREIGN PATENT DOCUMENTS

| EP | 0715391 | B1 | 3/1999 |
| EP | 3412494 | * | 3/2019 |

* cited by examiner

*Primary Examiner* — Richard V Muralidar
(74) *Attorney, Agent, or Firm* — Shumaker, Loop & Kendrick, LLP; James D. Miller (57) ABSTRACT

A heat exchanger for use in a vehicle powered by a battery comprises an inner tube having an onboard charging cable associated with a charging of the battery disposed therein and an outer tube surrounding the inner tube. A refrigerant configured to cool the onboard charging cable flows through a flow path formed between the inner tube and the outer tube. A first connector is coupled to a first end of the outer tube. The first connector is in fluid communication with the flow path formed between the inner tube and the outer tube and further includes an opening for receiving a portion of the inner tube. The inner tube is securely coupled to the first connector at a joint therebetween to establish a position of the inner tube relative to the outer tube.

20 Claims, 3 Drawing Sheets

ELECTRIC VEHICLE ONBOARD CHARGING CABLE COOLING

FIELD OF THE INVENTION

The present invention relates to a heat exchanger assembly for cooling electrical cables, and more specifically, to a heat exchanger assembly utilizing a refrigerant of a heating, ventilating, and air conditioning (HVAC) system to cool an onboard charging cable associated with a battery of an electric vehicle.

BACKGROUND OF THE INVENTION

Electric vehicles and hybrid electrical vehicles typically include a battery assembly for generating the power necessary to drive the associated vehicle, wherein the battery assembly must be intermittently charged in order to store the energy to be expended during each period of operation of the associated electric vehicle. The charging of the battery assembly may include the use of onboard charging cables that electrically connect the associated battery assembly to an onboard battery charger of the electric vehicle. The onboard battery charger may be electrically connected to a charging port of the vehicle, wherein the charging port may be adapted coupling with a power outlet or charging station responsible for providing the electrical energy for charging the battery assembly.

It is beneficial to complete the charging process of the battery assembly as fast as possible in order to avoid undesired periods of inactivity of the electric vehicle. As such, it is desirable to increase the rate at which the battery assembly is charged by increasing the current flow supplied to the battery assembly during the charging process. However, such an increase in current flow tends to correspond to a resulting increase of electrical resistance of the electrically conductive material forming the onboard charging cables. This increase in electrical resistance decreases the efficiency of the onboard charging cables and may further necessitate the use of onboard charging cables having an increased wire gauge. The increase in the wire gauge of such onboard charging cables can cause the cables to be undesirably bulky, expensive, and difficult to package within the electric vehicle.

For each of the foregoing reasons, it would be desirable to provide a system and method for cooling the onboard charging cable of an electric vehicle during a charging session thereof in order to increase an operational efficiency of the onboard charging cable.

SUMMARY OF THE INVENTION

Compatible and attuned with the present invention, an improved system and method for cooling an onboard charging cable of an electric vehicle has been surprisingly discovered.

In one embodiment of the invention, a heat exchanger for use in a vehicle powered by a battery is disclosed. The heat exchanger comprises an inner tube having an onboard charging cable associated with a charging of the battery disposed therein and an outer tube surrounding the inner tube. A fluid configured to cool the onboard charging cable flows through a flow path formed between the inner tube and the outer tube.

According to another embodiment of the invention, a refrigerant circuit for an electric vehicle having an onboard charging cable for charging a battery of the electric vehicle is disclosed. The refrigerant circuit comprises a cable cooling heat exchanger, the cable cooling heat exchanger including an inner tube having the onboard charging cable disposed therein and an outer tube surrounding the inner tube, wherein a refrigerant circulated through the refrigerant circuit flows through a flow path formed between the inner tube and the outer tube.

A method of cooling an onboard charging cable of an electric vehicle is also disclosed. The method comprises the steps of: providing a refrigerant circuit having a cable cooling heat exchanger, the cable cooling heat exchanger including an inner tube having the onboard charging cable disposed therein and an outer tube surrounding the inner tube; and circulating a refrigerant through the refrigerant circuit, wherein the refrigerant flows through a flow path formed between the inner tube and the outer tube of the cable cooling heat exchanger.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawings.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
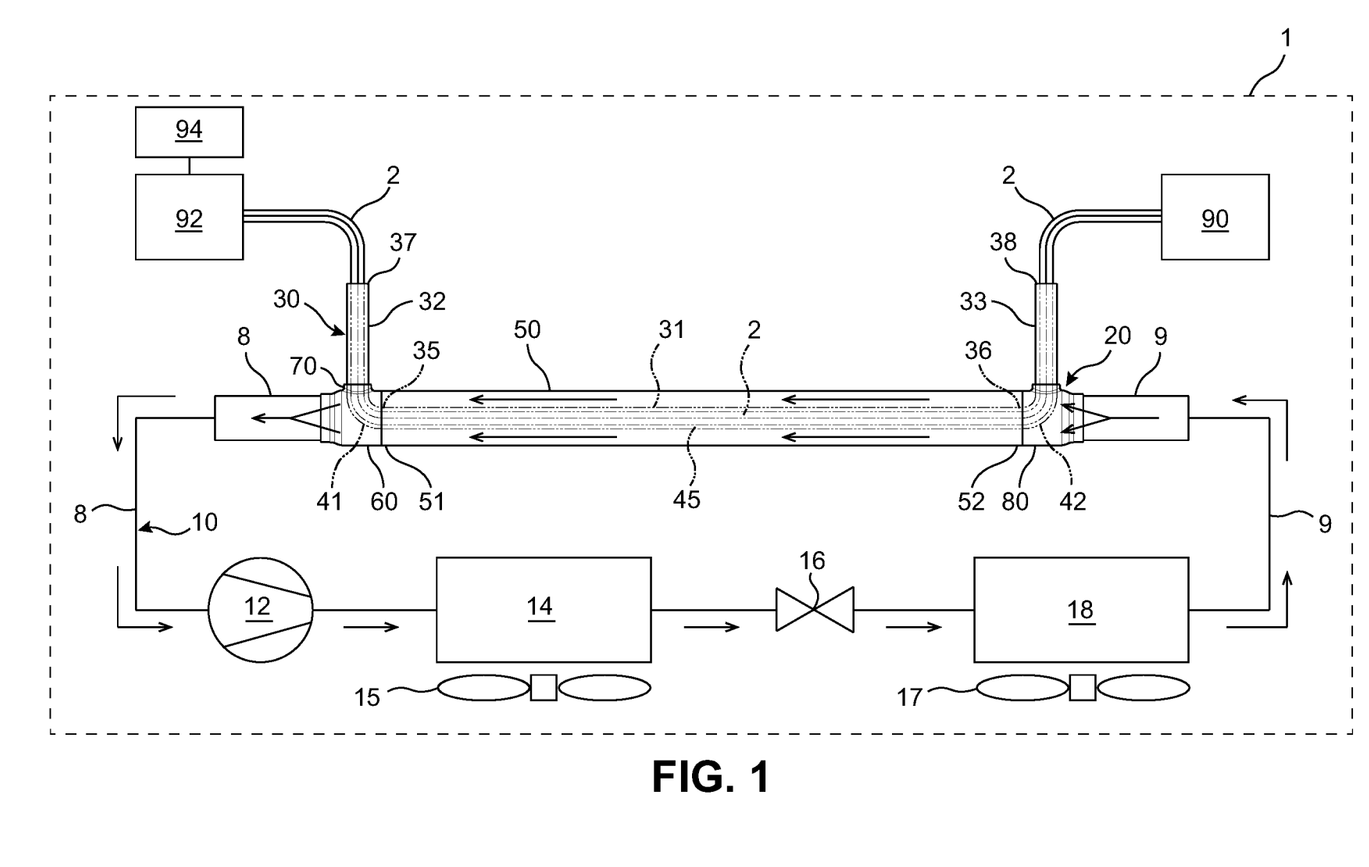
FIG. 1 is a partially schematic representation of an electric vehicle having a refrigerant circuit with a cable cooling heat exchanger according to an embodiment of the present invention.

FIG. 1 illustrates an electric or electric hybrid vehicle 1 according to an embodiment of the present invention. The vehicle 1 generally includes a rechargeable battery 90 for powering the vehicle 1, wherein the battery 90 may be provided as an assembly of a plurality of battery cells or modules in electrical communication with each other. The battery 90 may be formed by an array of lithium-ion battery cells, for example. The battery 90 is electrically coupled to an onboard battery charger 92 by an onboard charging cable 2.

The onboard charging cable 2 may be presented as a single cable having multiple internally disposed leads 3 encapsulated by a single insulating cover 4 or the onboard charging cable 2 may be presented as multiple independently provided leads 3 with each of the leads 3 having a respective cover 4. The onboard charging cable 2 may include any number of the electrically conductive leads 3 disposed within any number of the electrically insulating covers 4, as desired for the given application. In the provided embodiment, the onboard charging cable 2 is shown as including two of the leads 3 and a single insulating cover 4, wherein the cover 4 electrically isolates the leads 3 from each other as well as the exterior of the cover 4. However, the onboard charging cable 2 may include fewer or more leads 3 and may include an individual one of the covers 4 for each of the provided leads 3, as desired. The leads 3 may be formed from any electrically conductive material suitable for transferring electrical power from the battery charger 92 to the battery 90, as desired. The leads 3 may be formed from aluminium or copper, as non-limiting examples. In some embodiments, the leads 3 may be formed by braided extensions of the electrically conductive material forming each of the leads 3. The cover 4 may be formed from any electrically insulating material also having suitable thermal conductivity for transferring heat energy from the leads 3 to the exterior of the associated cover 4. The cover 4 may be formed from silicon, as one non-limiting example. The onboard charging cable 2 may further include additional layers intermediate the leads 3 and the associated cover 4, such as layers of aluminium or copper screening or foil, as desired. One skilled in the art will appreciate that a variety of different cable configurations are suitable for use with the disclosed vehicle 1 without departing from the scope of the present invention.

The battery charger 92 is electrically coupled to a charging port 94 of the vehicle 1. The charging port 94 is configured for selective mating engagement with an external charging cable (not shown) associated with an independent energy source such as an electrical outlet (not shown) or a dedicated charging station (not shown), as non-limiting examples. The independent power source supplies electrical power to the charging port 94 via the external charging cable. The electrical power supplied by the independent power source is then transferred from the charging port 94 to the battery charger 92 via a suitable electrical connection before subsequently being transferred from the battery charger 92 to the battery 90 via the associated onboard charging cable 2.

The vehicle 1 further includes a refrigerant circuit 10 configured to circulate a refrigerant therethrough. The refrigerant circuit 10 includes a compressor 12, a first heat exchanger 14 acting as a condenser, an expansion element 16, a second heat exchanger 18 acting as an evaporator, and a cable cooling heat exchanger 20. The cable cooling heat exchanger 20 is herein referred to as the cable cooler 20 for brevity. As shown by the phantom lines in FIG. 1, the onboard charging cable 2 connecting the battery 90 to the battery charger 92 is received in and routed through a portion of the cable cooler 20. The cable cooler 20 accordingly acts as a heat exchanger for exchanging heat energy between the refrigerant passed through the refrigerant circuit 10 and the onboard charging cable 2 routed within the portion of the cable cooler 20, as explained in greater detail hereinafter.

The cable cooler 20 includes an inner tube 30, an outer tube 50, a first connector 60 coupled to a first end 51 of the outer tube 50, and a second connector 80 coupled to a second end 52 of the outer tube 50. The inner tube 30, outer tube 50, first connector 60, and second connector 80 are each formed from a substantially rigid material suitable for accommodating the temperature and pressure of the refrigerant circulating through the refrigerant circuit 10. The rigid material may also be provided to include desired chemical resistance characteristics when encountering the refrigerant, as desired. The solid rigid material may be a metallic material, such as aluminium or an alloy thereof, as one non-limiting example. Each of the disclosed components 30, 50, 60, 80 may be formed from a common metallic material or the components 30, 50, 60, 80 may be formed from two or more independent metallic materials compatible for being joined in an aggressive metal joining process such as brazing or welding.

The inner tube 30 includes a circular cross-sectional shape having a substantially constant inner diameter and a substantially constant outer diameter along an entirety of a length of the inner tube 30. The inner tube 30 may be formed by bending or otherwise forming a length of linearly extending cylindrical tubing into the shape shown in FIGS. 1-3. The disclosed configuration includes a centrally located and cylindrically extending first segment 31 having a first end 35 transitioning into a first bent portion 41 and an opposing second end 36 transitioning into a second bent portion 42. The first bent portion 41 transitions into a cylindrically extending second segment 32 of the inner tube 30 while the second bent portion 42 transitions into a cylindrically extending third segment 33 of the inner tube 30. The arrangement of the segments 31, 32, 33 and the bent portions 41, 42 may result in the inner tube 30 extending lengthwise to form a substantially U-shaped configuration.

The first bent portion 41 establishes a transverse arrangement between the first segment 31 and the second segment 32 while the second bent portion 42 establishes a transverse arrangement between the first segment 31 and the third segment 33. In the provided embodiment, each of the bent portions 41, 42 is shown as curving through an angle of about 90 degrees to establish a perpendicular relationship between the first segment 31 and each of the second segment 32 and the third segment 33. However, it should be understood by one skilled in the art that the first bent portion 41 and the second bent portion 42 may include alternative curvatures for establishing alternative angles of inclination between the disclosed segments 31, 32, 33 without necessarily departing from the scope of the present invention. For example, one or both of the bent portions 41, 42 may include a curvature suitable for arranging one or both of the segments 32, 33 at a non-perpendicular angle relative to the centrally located first segment 31. The alternative angle of inclination for one or both of the laterally disposed segments 32, 33 may be selected for accommodating a packaging space available within the vehicle 1 that is suitable for receiving the cable cooler 20 therein. However, it is assumed hereinafter that the inner tube 30 is substantially symmetric about a plane arranged perpendicular to the longitudinal direction of the first segment 31 of the inner tube 30.

An end 37 of the second segment 32 forming one end of the inner tube 30 is open to provide access to a hollow interior 45 of the inner tube 30 defined by the inner diameter thereof. Similarly, a distal end 38 of the third segment 33 forming an opposing end of the inner tube 30 is also open to extend the hollow interior 45 through an entirety of the length of the inner tube 30. The inner tube 30 is accordingly suitable for receiving the onboard charging cable 2 therein in a manner wherein the onboard charging cable 2 can extend outside of each of the opposing open ends 37, 38 of the inner tube 30. The end portions of the onboard charging cable 2 extending outside of the inner tube 30 extend through a corresponding portion of the vehicle 1 before reaching each of the battery 90 and the spaced apart battery charger 92, respectively. Each of the ends 37, 38 of the inner tube 30 may be sealed by a rubber or plastic dust seal (not shown) following reception of the onboard charging cable 2 therein to prevent the ingress of debris into the inner tube 30.

Figure 3:
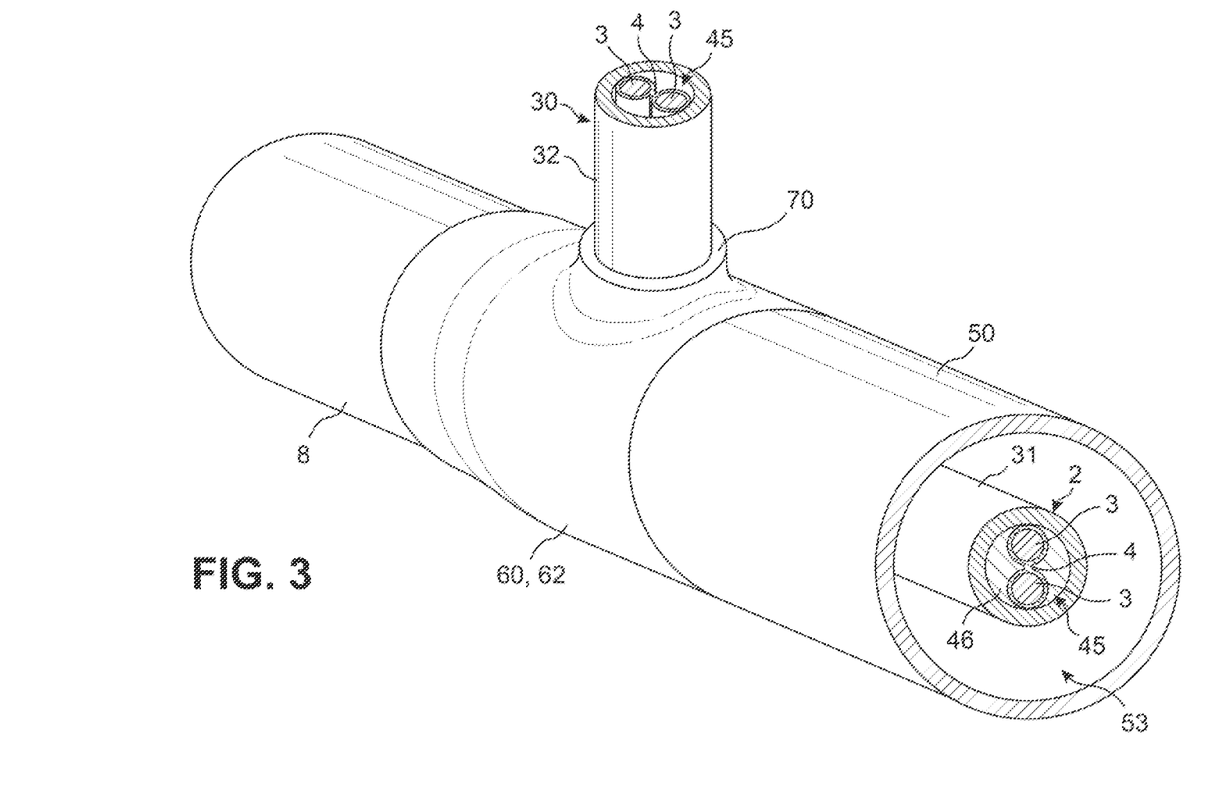
FIG. 3 is a fragmentary perspective view of the portion of the cable cooling heat exchanger of FIG. 1.

As shown in FIG. 3, the onboard charging cable 2 extends across an area occupying only a portion of the circular cross-sectional shape defining the hollow interior 45 of the inner tube 30. The portions of the hollow interior 45 not occupied by the onboard charging cable 2 may be filled by a thermal interface material 46 suitable for improving the heat transfer between the onboard charging cable and the inner tube 30. A composition of the thermal interface material 46 may be selected to be chemically compatible with each of the material forming the cover 4 and the material forming the inner tube 30. The thermal interface material may be a thermal grease having a thermally conductive filler distributed therein, such as a filler comprised of particles of silver, aluminium, diamond, or ceramics, as non-limiting examples. The thermal grease may include a matrix material comprised of silicone, but other suitable combinations may be used without departing from the scope of the present invention. The thermal interface material 46 may be present within the inner tube 30 along only those portions thereof disposed within one of the first connector 60, the outer tube 50, or the second connector 80. The second segment 32 and the third segment 33 may accordingly be provided devoid of the thermal interface material 46.

The outer tube 50 is cylindrical in shape and defines a cylindrical hollow interior 53 extending longitudinally from the first end 51 to the second end 52 of the outer tube 50. The first end 51 and the second end 52 of the outer tube 50 are each open to provide fluid access to the hollow interior 53. As best shown in FIG. 3, the outer tube 50 is arranged to be co-axial and concentrically arranged with respect to the centrally located and cylindrical first segment 31 of the inner tube 30, thereby establishing an even radial spacing between the tubes 30, 50 along the length of the first segment 31. A radial spacing provided between the tubes 30, 50 along the first segment 31 may be selected based on the desired flow characteristics through the cable cooler 20, such as a desired volumetric flow rate of the refrigerant when flowing through the cable cooler 20. The arrangement of the inner tube 30 relative to the outer tube 50 accordingly results in the formation of an annular flow path for the refrigerant within the hollow interior 53 of the outer tube 50 between an inner surface of the outer tube 50 and an outer surface of the inner tube 30.

As can be seen from review of FIG. 1, the first connector 60 and the second connector 80 are symmetrically arranged and otherwise identical in configuration, hence description is primarily directed towards the structure of the first connector 60. The first connector 60 is formed by a housing 62 defining a hollow interior 65 of the first connector 60. The housing 62 includes a first opening 67, a second opening 68, and a third opening 69. In the provided example, the housing 62 is substantially cylindrical in shape with the first opening 67 and the oppositely arranged second opening 68 formed by opposing open ends of the housing 62. In contrast, the third opening 69 is formed in an outer circumferential surface of the cylindrical housing 62 and is arranged transversely relative to the first opening 67 and the second opening 68. In the provided example, the perpendicular arrangement between the first segment 31 and the second segment 32 of the inner tube 30 leads to the third opening 69 being arranged perpendicularly relative to the first opening 67 and the second opening 68, but alternative angles of inclination may be used to accommodate alternative configurations.

Figure 2:
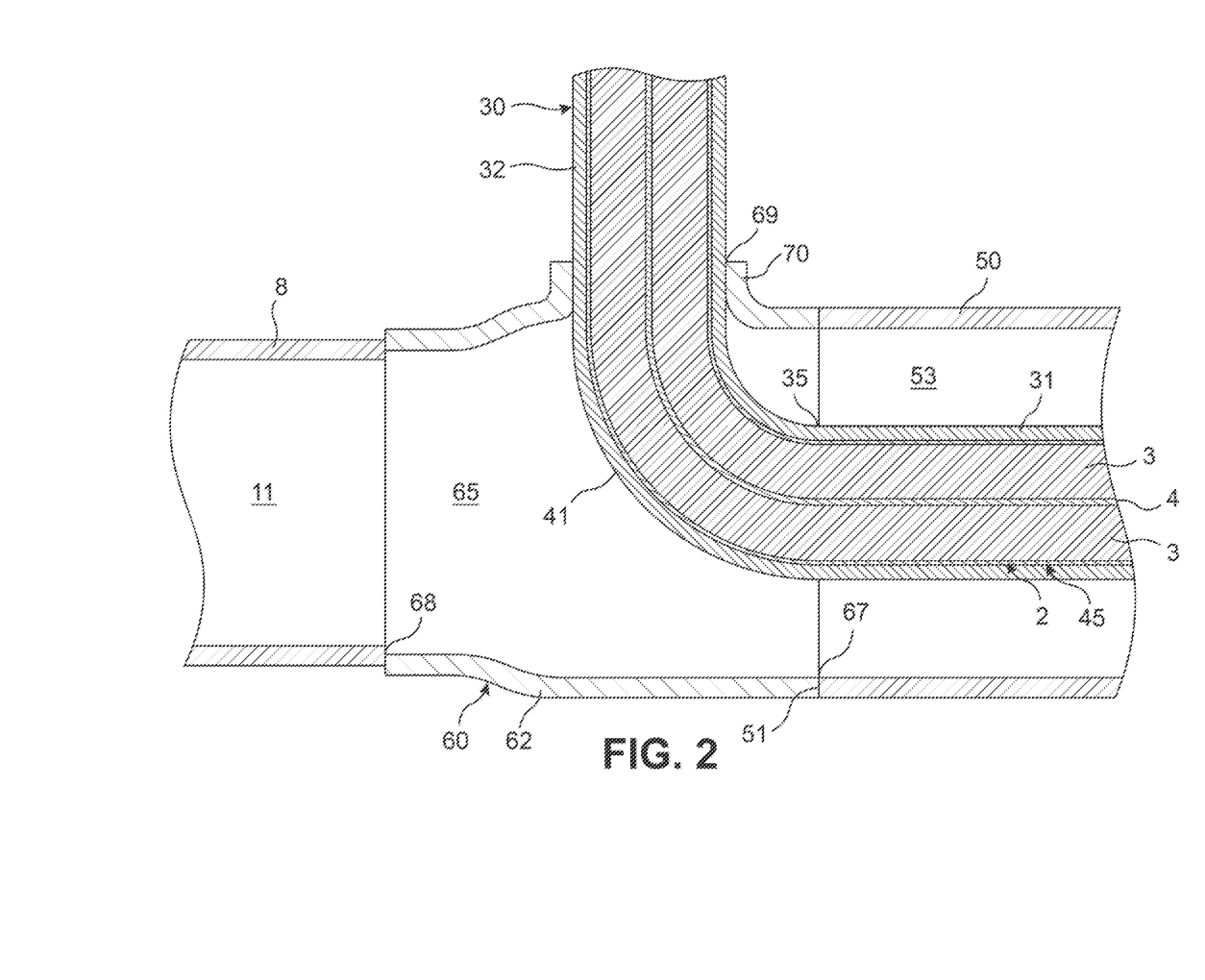
FIG. 2 is a fragmentary cross-sectional elevational view of a portion of the cable cooling heat exchanger of FIG. 1.

The third opening 69 may be formed at an end of a cylindrical collar 70 projecting radially outwardly from the outer circumferential surface of the housing 62. An inner diameter of the collar 70, and hence the third opening 69, may be dimensioned substantially equally to the outer diameter of the inner tube 30 to provide for a close fit or a press fit relationship therebetween. As best shown in FIG. 2, the collar 70 may receive the linearly extending second segment 32 of the inner tube 30 immediately adjacent the boundary between the first bent portion 41 and the second segment 32 thereof.

The first connector 60 is shown as being associated with a hollow and cylindrical first fluid line 8 configured for conveying the refrigerant to an adjacent component disposed on the refrigerant circuit 10. The first fluid line 8 may be representative of any type of pipe, conduit, hose, or similar structure suitable for fluidly coupling the first connector 60 to the remainder of the refrigerant circuit 10. In some embodiments, the first fluid line 8 may be representative of an inlet structure of an adjacent component of the refrigerant circuit 10 if the adjacent component is directly coupled to or otherwise integrated into the cable cooler 20. The first fluid line 8 may lead directly to a block seal fitting or the like associated with establishing a fluid tight seal with the adjacent component of the refrigerant circuit 10. With specific reference to FIG. 1, the first fluid line 8 is shown both schematically and structurally intermediate the compressor 12 and the cable cooler 20 in order to illustrate both the relative positioning of the cable cooler 20 relative to the remainder of the refrigerant circuit 10 as well as a structural configuration suitable for coupling the first connector 60 to the first fluid line 8. In the provided illustrations, the first fluid line 8 is shown as a substantially cylindrical conduit extending away from the cable cooler 20, but alternative flow shapes and configurations may be used without departing from the scope of the present invention.

In the provided example, the first fluid line 8 is shown as extending directly to the compressor 12. However, one skilled in the art should appreciate that additional conventional components may be disposed between the cable cooler 20 and the compressor 12 without departing from the scope of the present invention. For example, an accumulator for collecting liquid refrigerant upstream of the compressor 12 or an inner heat exchanger for exchanging heat between a low pressure portion of the refrigerant and a high pressure portion of the refrigerant may be disposed between the cable cooler 20 and the compressor 12, as non-limiting examples, without necessarily frustrating the intended method of operation of the disclosed refrigerant circuit 10.

The first connector 60 is securely and rigidly coupled to each of the first fluid line 8, the inner tube 30, and the outer tube 50. More specifically, the open first end 51 of the outer tube 50 is coupled to the open end of the first connector 60 forming the first opening 67 while an open end of the first fluid line 8 is coupled to the open end of the first connector 60 forming the oppositely arranged second opening 68, thereby placing the hollow interior 65 of the first connector 60 in fluid communication with each of the flow path formed within the hollow interior 53 of the outer tube 50 and a hollow interior 11 of the first fluid line 8. The opposing and coaxial arrangement of the first opening 67 and the second opening 68 accordingly provides a substantially linear flow direction for the refrigerant when flowing out of the first connector 60 and into the first fluid line 8, thereby minimizing a pressure drop experienced by the refrigerant when traversing the cable cooler 20. In the provided embodiment, the coupling of the first connector 60 to each of the first fluid line 8 and the outer tube 50 may be accomplished by an aggressive metal joining process such as brazing or welding. Alternatively, one skilled in the art should appreciate that any coupling method allowing for a rigid connection and a substantially fluid tight seal between the first connector 60 and each of the first fluid line 8 and the outer tube 50 may be utilized without departing from the scope of the present invention. For example, the use of bolted flanges, threaded mating surfaces, crimping, or any other suitable coupling method or combination of coupling methods may be employed without departing from the scope of the present invention.

As mentioned previously, the second segment 32 of the inner tube 30 is closely received within the collar 70 defining the third opening 69 of the first connector 60. The close reception of the second segment 32 within the collar 70 facilitates the use of an aggressive metal joining process at the joint formed between the outer surface of the inner tube 30 and the inner surface of the collar 70, such as brazing or welding. The joining process is configured to both affix the position of the inner tube 30 relative to the first connector 60 and to provide a fluid tight seal at the joint formed between the collar 70 and the inner tube 30. Prior to initiation of the brazing or welding process, the second segment 32 may be moved axially relative to the collar 70 until the first segment 31 of the inner tube 30 is arranged co-axially relative to the outer tube 50, thereby establishing the substantially equal flow area between the first segment 31 of the inner tube 30 and the outer tube 50. The secure and rigid coupling of the inner tube 30 to the first connector 60 accordingly allows for the inner tube 30 to maintain its spatial relationship relative to the outer tube 50 without requiring the use of longitudinally spaced and radially extending structures such as a spokes or the like present between the inner tube 30 and the outer tube 50, which may undesirably contribute to a drop in pressure of the refrigerant when flowing through the cable cooler 20 during normal operation of the refrigerant circuit 10.

Although the first connector 60 is shown and described as being substantially cylindrical in shape, the housing 62 of the first connector 60 may alternatively be constructed to include any shape defining a hollow interior and having an opening fluidly coupling the first connector 60 to the outer tube 50, another opening fluidly coupling the first connector 60 to the adjacent first fluid line 8 and hence the remainder of the refrigerant circuit 10, and yet another opening configured to receive the inner tube 30 therein. Such alternative shapes may be considered when the packaging space available within the vehicle 1 is limited to specific configurations of each of the longitudinally extending portions of the cable cooler 20.

The second connector 80 is similarly securely and rigidly coupled to each of the second end 52 of the outer tube 50, an outer surface of the third segment 33 of the inner tube 30, and a cylindrical second fluid line 9 configured to convey the refrigerant between the cable cooler 20 and an adjacent component of the refrigerant circuit 10, which in the present embodiment is the second heat exchanger 18 acting as the evaporator. The third segment 33 of the inner tube 30 is rigidly and securely coupled to the second connector 80 using the same aggressive metal joining method such as brazing or welding. The secure coupling of the inner tube 30 to each of the connectors 60, 80 disposed on opposing sides of the first segment 31 of the inner tube 30 accordingly provides additional support for the inner tube 30 for establishing and maintaining the relative radial spacing between the inner tube 30 and the outer tube 50.

The vehicle 1 may further include a controller (not shown) in signal communication with various components forming the refrigerant circuit 10 as well as the disclosed electrical components such as the battery 90, the battery charger 92, and the charging port 94. The controller may be configured to activate any valves or flow controllers associated with operating the refrigerant circuit 10, including controlling a flow area through the expansion element 16 or any valves associated with directing flow through more complex configurations than that disclosed in FIG. 1. The controller may also be configured to selectively operate the compressor 12 for circulating the refrigerant through the refrigerant circuit 10 in response to a user selected setting or the determination by the controller that a specific condition of the vehicle 1 has been met. The controller may additionally be in signal communication with one or more blower assemblies associated with passing air over the first heat exchanger 14 acting as the condenser or the second heat exchanger 18 acting as the evaporator in order to remove heat from or add heat to the refrigerant in accordance with the selected mode of operation of the refrigerant circuit 10. For example, with renewed reference to FIG. 1, the first heat exchanger 14 acting as the condenser may be in fluid communication with a first blower assembly 15 while the second heat exchanger 18 acting as the evaporator may be in fluid communication with a second blower assembly 17. However, in other embodiments, the heat exchangers 14, 18 may be associated with a single, common blower assembly, as desired.

The cable cooler 20 of the present invention is configured to cool the onboard charging cable 2 during a charging of the battery 90. The charging of the battery 90 occurs with the vehicle 1 stationary and the charging port 94 electrically coupled to an associated external charging cable associated with the independent power source such as the described electrical outlet or dedicated charging station. A drive mechanism of the vehicle 1 is normally powered down during the charging process, but the controller and any other electrical components associated with the controller are capable of use during the charging session. The controller accordingly makes a determination that the charging session has begun when it is determined that an electrical connection is available between the external charging cable and the charging port 94 of the vehicle 1. The controller may further control the operation of the disclosed electrical components during the charging session, such as regulating the current passing from the battery charger 92 to the battery 90 through the onboard charging cable 2. The controller may be configured to charge the battery 90 at a plurality of different charging rates based on the current passed through the onboard charging cable 2 during the charging session, wherein increased current supply correlates to an increased charging rate and a decrease in the amount of time necessary to charge the battery 90.

The cooling of the onboard charging cable 2 occurs as follows. First, the controller determines that the charging session has been initiated upon a determination that the charging port 94 is electrically coupled to the independent power source. The controller then controls the disclosed electrical components in order to transfer current from the independent power source to the battery 90 through the onboard charging cable 92. The flow of the current through the onboard charging cable 2 causes the onboard charging cable to begin to increase in temperature during the charging process. As the onboard charging cable 2 increases in temperature, an electrical resistance of the onboard charging cable 2 also increases, which in turn decreases the efficiency of the onboard charging cable 2 in performing the charging process.

In order to cool the onboard charging cable 2 and increase the efficiency thereof, the controller causes the refrigerant to be circulated through the refrigerant circuit 10 in a manner wherein the heat generated by the onboard charging cable 2 can be transferred to the refrigerant when passing through the cable cooler 20. The circulating of the refrigerant may be achieved by the controller activating and operating the compressor 12 at a desired setting. The controller may be configured to activate the compressor 12 in reaction to any number of determinations made by the controller. In some embodiments, the controller may be configured to automatically activate the compressor 12 upon a determination of the initiation of the charging session. In other embodiments, the controller may be configured to only activate the compressor 12 following the elapse of a predetermined period of time following the initiation of the charging session. In yet other embodiments, the controller may be configured to activate the compressor 12 only when a predetermined condition of the onboard charging cable 2 has been met. The controller may be in communication with one or more sensors (not shown) responsible for determining the condition of the onboard charging cable 2, such as a temperature sensor or an electrical resistance sensor. For example, the controller may activate the compressor 12 following a determination that the onboard charging cable 2 has met or exceeded a predetermined temperature value or electrical resistance value. The controller may also activate each of the disclosed blower assemblies 15, 17 associated with operation of the disclosed first and second heat exchangers 14, 18 when the determination is made to activate the compressor 12, thereby ensuring that heat can be added or removed from the refrigerant when passing through the respective components of the refrigerant circuit 10.

The refrigerant circuit 10 is illustrated in FIG. 1 as including a series of arrows showing the direction of flow of the refrigerant during a battery charging mode of operation of the refrigerant circuit 10 following the activation of the compressor 12 and the associated blower assemblies 15, 17. The disclosed battery charging mode of operation may be substantially similar to an air conditioning mode of operation of the refrigerant circuit 10 suitable for the cooling of air to be distributed to a passenger compartment (not shown) of the vehicle 1.

During the disclosed battery charging mode, the refrigerant is first received into the compressor 12 as a low temperature, low pressure gaseous vapor before being compressed therein. The refrigerant exits the compressor 12 as a high temperature, high pressure gaseous vapor that is then directed to the first heat exchanger 14 acting as the condenser. A flow of air (or other suitable heat exchanging fluid) is then passed over the first heat exchanger 14 in order to remove heat energy from the refrigerant, thereby causing the refrigerant to be cooled and condensed within the first heat exchanger 14 into a relatively high temperature liquid. The high temperature liquid refrigerant is then constricted and expanded within the expansion element 16 to cause the refrigerant to exit the expansion element 16 as a relatively low temperature liquid. The low temperature liquid refrigerant is then passed through the second heat exchanger 18 acting as the evaporator while a flow of air (or other heat exchanging fluid) is caused to flow over the second heat exchanger 18 in order to transfer heat to the low pressure liquid refrigerant, thereby evaporating the liquid refrigerant into a low temperature, low pressure gaseous vapor suitable for reception within the low pressure side of the compressor 12. The low temperature gaseous refrigerant then flows through the cable cooler 20 before re-entering the low pressure side of the compressor 12. When passing through the cable cooler 20, the refrigerant passes in order through the second connector 80, the flow path formed within the outer tube 50, and the first connector 60. The heat generated by the onboard charging cable 2 is transferred to the low temperature, low pressure gaseous refrigerant through the inner tube 30. The thermal interface material 46 disposed between the onboard charging cable 2 and the inner tube 30 further aids in transferring the heat from the onboard charging cable 2 to the inner tube 30. The heat transferred to the inner tube 30 is then transferred to the flow of the refrigerant passing through the flow path formed between the inner tube 30 and the outer tube 50.

The disclosed refrigerant circuit 10 having the cable cooler 20 provides numerous advantages. The cooling of the onboard charging cable 2 allows for increased current to be passed through the onboard charging cable 2, thereby increasing the charging rate while decreasing the time required for completing the charging session. The ability for the onboard charging cable 2 to receive increased current as a result of the cooling effect also allows for the onboard charging cable 2 to be provided with a minimized cross-sectional area for the associated electrically conductive material, which in turn allows the onboard charging cable 2 to be produced to be thinner and hence more pliable and easily routed through desired portions of the vehicle 1.

The disclosed configuration of the cable cooler 20 also beneficially results in a minimized pressure drop of the refrigerant when passing through the cable cooler 20. The annular shape of the flow path between the inner tube 30 and the outer tube 50 presents minimized drag on the flow of the refrigerant when passing therethrough. Additionally, the bent portions 41, 42 form the only flow obstructions within the otherwise linearly extending flow of the refrigerant when passing through the cable cooler 20, with the bent portions 41, 42 of the inner tube 30 blocking only a small portion of the entire cross-section of the annular flow path. Furthermore, each of the bent portions 41, 42 includes the inner tube 30 having a curved outer shape facing towards the flow of the refrigerant for promoting a smooth and gradual division of the refrigerant when passing over each of the bent portions 41, 42.

The positioning of the cable cooler 20 downstream of the second heat exchanger 18 acting as the evaporator beneficially increases a cooling capacity of the cable cooler 20 due to the decrease in pressure in the refrigerant when passing through the upstream arranged second heat exchanger 18. The ability for the gaseous refrigerant to flow through an entirety of the cross-section of the annular flow path between the inner tube 30 and the outer tube 50 also promotes homogeneous heat transfer about a perimeter of the inner tube 30.

Although not pictured, it should be understood that the refrigerant circuit 10 may include additional components and flow arrangements without necessarily departing from the scope of the present invention. For example, the refrigerant circuit 10 may include a receiver drier (not shown), an inner heat exchanger (not shown) for transferring heat energy between a low pressure side and a high pressure side of the refrigerant circuit 10, or a chiller (not shown) or similar heat exchanger suitable for cooling or heating various components of the vehicle 1, such as the battery 80 or an inverter (not shown) associated with the compressor 12, as non-limiting examples.

It should also be understood that the refrigerant circuits typically associated with the operation of an electric or hybrid electric vehicle often include various additional valves and flow lines in order to achieve a variety of different operational modes, such as reversing flow through one or more segments of the refrigerant circuit in order to reverse the intended purpose of one or more of the associated heat exchangers. For example, it is not uncommon for such a refrigerant circuit to include a reversal of flow through the heat exchangers normally forming the condenser and the evaporator thereof when an alternative operating mode of the refrigerant circuit is desired, such as a cabin heating mode of operation of the associated refrigerant circuit wherein heat is removed from the refrigerant within the heat exchanger normally acting as the evaporator during a cabin cooling mode of operation. As such, the components forming the disclosed refrigerant circuit 10 may preferably be formed to be reversibly flowable in a manner wherein an excessive pressure drop is not experienced by the refrigerant when traversing the refrigerant circuit 10 regardless of the direction of flow of the refrigerant.

In view of the above, the cable cooler 20 provides an additional advantage in that the cable cooler 20 can be reversibly passed by the refrigerant without the form or configuration of the cable cooler 20 significantly altering the flow characteristics of the refrigerant. Specifically, the substantially symmetric arrangement of the cable cooler 20 allows for the refrigerant to encounter substantially similar structural features regardless of the direction of flow of the refrigerant. As such, the cable cooler 20 may be passable for a variety of different operational modes of the refrigerant circuit 10 without necessarily frustrating the intended object of each operational mode.

However, it should also be understood that the refrigerant circuit 10 as disclosed in FIG. 1 may also be modified such that the cable cooler 20 is only passed selectively during the charging mode of operation disclosed herein. For example, the cable cooler 20 may be disposed on a branch line (not shown) arranged parallel to the remainder of the refrigerant circuit 10. The branch line may include one or more valves configured to control whether the refrigerant is distributed to the branch line and therefore the cable cooler 20, wherein the valves may similarly be controlled by the controller upon a determination that the compressor 12 is to be activated.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A heat exchanger for use in a vehicle powered by a battery, the heat exchanger comprising:
    an inner tube having an onboard charging cable disposed therein; and
    an outer tube surrounding the inner tube, wherein a fluid configured to cool the onboard charging cable flows through a flow path formed between the inner tube and the outer tube.

2. The heat exchanger of claim 1, further comprising a first connector coupled to a first end of the outer tube, an interior of the first connector in fluid communication with the flow path formed between the inner tube and the outer tube.

3. The heat exchanger of claim 2, further comprising a second connector coupled to a second end of the outer tube, an interior of the second connector in fluid communication with the flow path formed between the inner tube and the outer tube.

4. The heat exchanger of claim 2, wherein the first connector includes an opening configured to receive the inner tube therein.

5. The heat exchanger of claim 4, wherein the inner tube is joined to the first connector at a joint formed between the inner tube and the first connector.

6. The heat exchanger of claim 5, wherein the inner tube is joined to the first connector by brazing or welding.

7. The heat exchanger of claim 1, wherein the inner tube includes a first segment arranged concentrically with the outer tube and a second segment arranged transversely relative to the first segment.

8. The heat exchanger of claim 7, wherein the second segment of the inner tube is coupled to a first connector coupled to a first end of the outer tube, an interior of the first connector in fluid communication with the flow path formed between the inner tube and the outer tube.

9. The heat exchanger of claim 1, wherein a thermal interface material is disposed in the inner tube between an inner surface of the inner tube and an outer surface of the onboard charging cable.

10. The heat exchanger of claim 1, wherein the inner tube includes a first segment arranged concentrically with the outer tube, a second segment arranged transversely relative to the first segment, and a first bent portion connecting the first segment to the second segment.

11. A refrigerant circuit for an electric vehicle having an onboard charging cable for charging a battery of the electric vehicle, the refrigerant circuit comprising:
    a cable cooling heat exchanger, the cable cooling heat exchanger including an inner tube having the onboard charging cable disposed therein and an outer tube surrounding the inner tube, wherein a refrigerant circulated through the refrigerant circuit flows through a flow path formed between the inner tube and the outer tube.

12. The refrigerant circuit of claim 11, wherein the refrigerant circuit further comprises a compressor, a first heat exchanger acting as a condenser, an expansion element, and a second heat exchanger acting as an evaporator, wherein the cable cooling heat exchanger is disposed downstream of the second heat exchanger with respect to the direction of flow of the refrigerant circulated through the refrigerant circuit.

13. The refrigerant circuit of claim 12, wherein the refrigerant is primarily a gaseous vapor when passing through the cable cooling heat exchanger.

14. The refrigerant circuit of claim 11, wherein the cable cooling heat exchanger further comprises a first connector coupled to a first end of the outer tube, an interior of the first connector in fluid communication with the flow path formed between the inner tube and the outer tube.

15. The refrigerant circuit of claim 14, wherein the inner tube includes a first segment arranged concentrically relative to the outer tube and a second segment arranged transversely relative to the first segment, wherein the second segment of the inner tube extends through an opening formed in the first connector.

16. A method of cooling an onboard charging cable of an electric vehicle, the method comprising the steps of:
    providing a refrigerant circuit having a cable cooling heat exchanger, the cable cooling heat exchanger including an inner tube having the onboard charging cable disposed therein and an outer tube surrounding the inner tube;
    circulating a refrigerant through the refrigerant circuit, wherein the refrigerant flows through a flow path formed between the inner tube and the outer tube of the cable cooling heat exchanger.

17. The method of claim 16, wherein the circulating of the refrigerant occurs following a determination that a charging session of the electric vehicle has been initiated.

18. The method of claim 16, wherein the circulating of the refrigerant includes activating a compressor of the refrigerant circuit.

19. The method of claim 16, wherein a heat exchanger acting as an evaporator of the refrigerant circuit is disposed upstream of the cable cooling heat exchanger with respect to the direction of the flow of the refrigerant during the circulating step.

20. The method of claim 16, further including a step of providing a thermal interface material within the inner tube between an inner surface of the inner tube and an outer surface of the onboard charging cable.

\* \* \* \* \*